Dec. 25, 1928.

C. I. HALL 1,696,600

DEMAND METER ATTACHMENT FOR FLUID METERS

Filed Feb. 11, 1925

Inventor:
Chester I. Hall,
by Alexander F. Lunt
His Attorney.

Patented Dec. 25, 1928.

1,696,600

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND-METER ATTACHMENT FOR FLUID METERS.

Application filed February 11, 1925. Serial No. 8,553.

My invention relates to a demand meter attachment for fluid meters such for example as gas meters.

When a number of gas consuming installations are supplied from a single gas main of considerable length, there may exist an undesirable fluctuation in gas pressure at those installations located most remote from the supply tank, due to large variations in the amount of gas drawn off at some intermediate point or points in the gas main. The ability of a given gas main to satisfactorily supply a number of installations thus arranged depends largely upon the maximum demand of individual installations. The situation is much the same as that met with in an electric distribution system supplying a number of customers and it is just to impose a penalty, in addition to the usual charge, against those customers who use gas in excess of a predetermined agreed rate above their average consumption. The object of the present invention is to provide a demand meter attachment which may be installed with existing gas or other fluid meters such as steam, water or oil meters to register or record the maximum demand for the purpose of imposing an extra charge if the consumption, over a given period, is in excess of an agreed amount.

In carrying my invention into effect, I prefer to make use of a demand attachment of standard construction. Specifically my invention lies in the nature of the connection between the fluid meter and the demand attachment whereby an existing type of demand attachment may be installed with an existing type of fluid meter without interfering with the normal operation of the fluid meter.

Figure 1:
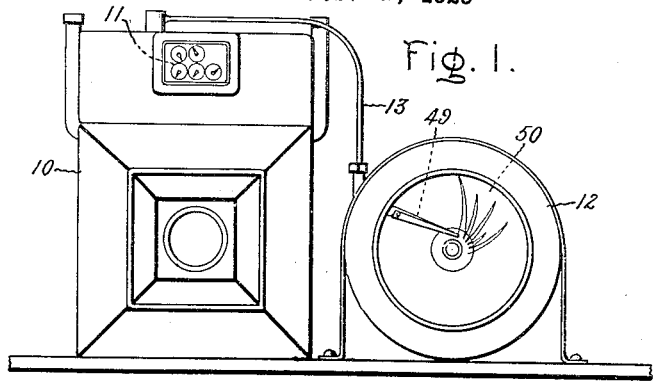
Figure 2:
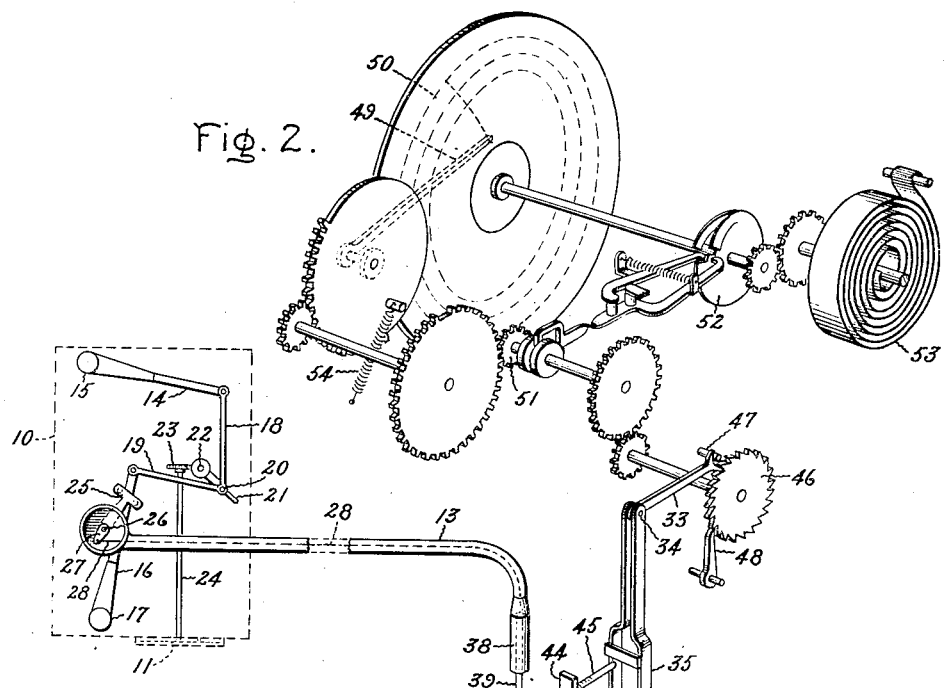
Figure 3:
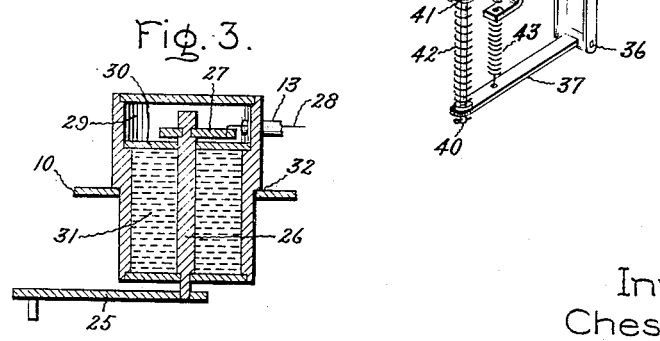

The features of my invention which are believed to be novel and patentable will be pointed out in the claim appended hereto. For a better understanding of my invention reference is made in the following description to the accompanying drawing, in which Fig. 1 illustrates the exterior appearance and arrangement of a demand meter attachment as applied to an ordinary gas meter in accordance with my invention. Fig. 2 represents the preferred arrangement of the interconnected operating mechanism between the two meters and Fig. 3 is a cross section through a gas tight seal for leading the mechanical operating connection through the casing of the gas meter.

In Fig. 1, 10 represents an ordinary gas meter having a registering dial 11. 12 represents a maximum demand recording meter of the dial chart type. The connection between the two meters is by way of a flexible slidable rod contained within a flexible tube 13 and it will appear from the description which follows that the two meters may be placed in any desired position with respect to each other and at any convenient distance apart.

In Fig. 2 the outline of the gas meter is represented in dotted lines and a portion of the usual operating mechanism is exposed to view as it would appear looking through the top of the meter in Fig. 1. A lever arm 14 pivoted on an axis 15 and a lever arm 16 pivoted on an axis 17 are connected with the valve mechanism of the meter, not shown, in such a way that these levers oscillate when gas flows through the meter. Lever 14 moves up and down as viewed in Fig. 2 and lever 16 moves back and forth crosswise of the meter. These levers are interconnected by links 18 and 19 at a pivot point 20 on a crank arm 21 which is mounted on a shaft 22. The arrangement is such that the oscillation of the levers causes the rotation of arm 21 about the axis 22 in a given direction at a rate depending upon the amount of gas flowing through the meter. The shaft 22 which is thus caused to rotate drives the register 11 through worm gears 23 and a shaft 24. As thus far described, the arrangement is in general similar to that found in the usual gas meter for integrating the volume of gas used.

Embracing the lever 16 near its outer end is a forked lever 25. This lever is mounted on a shaft 26, extending through the top of the meter case. The shaft 26 carries a second short lever 27 exterior of the case to which the slidable flexible rod 28 is attached. As the lever 16 oscillates, it imparts a corresponding oscillation to levers 25 and 27 and causes the rod 28 to be moved back and forth through the tube 13.

In order to make a gas tight connection through the wall of the gas meter, the shaft 26 is mounted in a cup 29 having a partition 30. The inner chamber of the cup is filled with a heavy grease 31 which effectively prevents the escape of gas. To install this connection on an existing gas meter a circular opening is cut in the wall opposite one of the oscillating levers of the meter, the cup with its shaft and lever is inserted through the opening in the manner indicated in Figs. 2 and 3 and the joint at 32 between the cup and casing 10 is then soldered up.

The rod or wire 28 has the right degree of stiffness and flexibility to permit it being easily shoved through the tube 13 without kinking. I have found piano wire suitable for this purpose. The length of the tube 13 and the rod 28 are such as to bring their outer ends in operative relation with the ratchet mechanism of the demand meter.

This ratchet mechanism comprises a ratchet pawl 33 pivoted at 34 to the vertical arm of a lever 35. The lever 35 is pivoted at 36 and has a horizontal arm 37 which is caused to be moved up and down by the reciprocating movement of the rod 28 in tube 13. Preferably a lost motion connection is made between the rod 28 and the lever arm 37 to improve the action, the movement of the wire 28 being somewhat greater than that necessary to operate the ratchet mechanism. In the present case the lower end of tube 13 is enlarged as at 38 and carries a plunger 39. Plunger 39 passes freely through a hole in lever 37 and is prevented from withdrawal by a pin 40. Plunger 39 carries a collar 41 and between this collar and the lever arm 37 is a compression spring 42. A light spring 43 is also provided between a stationary support 44 and the lever arm 37. An adjustable stop 45 is provided to limit the backward movement of lever arm 35. The pawl 33 cooperates with the advancing ratchet wheel 46 of the demand meter and its forward movement is limited by a stop 47.

In the position illustrated the ratchet mechanism is shown in the advanced position with pawl 33 resting against stop 47 and rod 28 and plunger 39 drawn upward with respect to lever arm 37. Now as lever 16 moves to the left levers 25 and 27 will be rotated counter clockwise with shaft 26, moving rod 28 downward against plunger 39. Plunger 39 with its collar 41 moves downward compressing spring 42 and sliding to some extent through lever arm 37. Springs 42 and 43 are so adjusted that by the time rod 28 and plunger 39 are moved to their maximum downward position spring 42 pushes lever arm 37 downward which places spring 43 under tension and withdraws ratchet pawl 33 with lever arm 35 against stop 45, the pawl sliding over a tooth in the ratchet wheel 46. As rod 28 moves in the opposite direction, due to the return of lever 16 to the right, plunger 39 rises releasing any tension on spring 42. Spring 43 then pulls levers arm 37 up and the ratchet pawl 33 advances to rotate ratchet wheel 46 the distance of one tooth where it is held against backward rotation by a pawl 48.

The remaining parts of the demand meter shown in the drawing are in general similar to that shown and described in my United States Patent 1,331,915.

The ratchet wheel 46 advances an indicating and recording pointer 49 in an outwardly radial direction across a chart 50 through the medium of a series of interconnected gears, one of which 51 is arranged to be momentarily slid out of mesh at intervals by means of a cam and lever device 52. The cam is driven by clockwork indicated at 53 which also drives the chart. At the end of a demand interval when the gear 51 is slid out of mesh with its cooperating gear, a spring 54 returns the pointer 49 to a zero position. The apparatus thus leaves a record on the chart of the maximum demand consumption over consecutive equal intervals of time such, for example, as every 15 minutes while the register 11 gives the total consumption.

In an installation of this character it is essential that the work necessary to operate the demand meter mechanism be sufficiently insignificant as not to cause an error in the measurement performed by the fluid meter since it will be noted that this work is performed by the gas or other fluid passing through the meter. In this respect my attachment is satisfactory. It is also essential that the gas meter be maintained gas tight as otherwise there would be danger from the standpoints of health and fire. This feature is assured by reason of the double gas seal where the shaft 26 enters and leaves the grease chamber of cup 29. Other desirable features of my invention are the flexible connection which permits the two metering devices to be installed without regard to any particular fixed relation between them, the adaptability of the connection to existing types of meters of both classes and the ease by which the installation may be made. It will be noted that this new combination is made available by supplying the parts consisting of the cup 29 and its attachments, the flexible connection 13, 28 and the necessary ratchet mechanism.

I do not wish to be limited to the particular arrangement herein described since I believe the combination to be broadly new and patentable within the limits specified in the appended claim.

What I claim as new and desire to secure by Letters Patent of the United States, is:

In a meter installation, an oscillating arm, a ratchet wheel and a mechanical driving connection between said arm and wheel comprising a ratchet lever and pawl for said ratchet wheel, a tube extending from the proximity of said arm to the proximity of said lever, a flexible rod extending through said tube adapted to be moved back and forth through said tube by the oscillations of said arm and a lost motion driving connection between said rod and ratchet lever.

In witness whereof, I have hereunto set my hand this 7 day of Feb., 1925.

CHESTER I. HALL.